(12) United States Patent
Schutt et al.

(10) Patent No.: US 11,518,452 B2
(45) Date of Patent: Dec. 6, 2022

(54) VEHICLE SUSPENSION POSITION ADJUSTMENT ARRANGEMENT

(71) Applicant: SAF-HOLLAND, Inc., Muskegon, MI (US)

(72) Inventors: Randy L. Schutt, Holland, MI (US); Ahmad Nizam Mohamad Jembari, Grand Haven, MI (US); Thomas D. Stoll, Grand Rapids, MI (US)

(73) Assignee: SAF-Holland, Inc., Muskegon, MI (US)

(*) Notice: Subject to any disclaimer, the term of this patent is extended or adjusted under 35 U.S.C. 154(b) by 246 days.

(21) Appl. No.: 16/893,642

(22) Filed: Jun. 5, 2020

(65) Prior Publication Data

US 2020/0385072 A1    Dec. 10, 2020

Related U.S. Application Data

(60) Provisional application No. 62/858,121, filed on Jun. 6, 2019.

(51) Int. Cl.
*B62D 53/06* (2006.01)
*B62D 53/08* (2006.01)
*B60G 99/00* (2010.01)

(52) U.S. Cl.
CPC ......... *B62D 53/068* (2013.01); *B60G 99/002* (2013.01); *B62D 53/0807* (2013.01)

(58) Field of Classification Search
CPC .............. B62D 53/068; B62D 53/0807; B60G 2204/4232; B60G 2204/61; B60G 2300/40; B60G 2401/172; B60G 2600/08
See application file for complete search history.

(56) References Cited

U.S. PATENT DOCUMENTS

| | | | | |
|---|---|---|---|---|
| 4,353,565 A | * | 10/1982 | Smith | B62D 53/068 280/149.2 |
| 4,993,737 A | * | 2/1991 | Torcomian | B62D 53/0814 280/407.1 |
| 5,137,296 A | * | 8/1992 | Forman | B62D 53/068 180/209 |
| 5,314,201 A | * | 5/1994 | Wessels | B62D 53/068 180/209 |

(Continued)

FOREIGN PATENT DOCUMENTS

| | | | | |
|---|---|---|---|---|
| EP | 1375205 A2 | * | 1/2004 | ....... B60G 17/01933 |
| EP | 1500579 A1 | * | 1/2005 | ............. B60D 1/155 |

*Primary Examiner* — Karen Beck
(74) *Attorney, Agent, or Firm* — Price Heneveld LLP (57) ABSTRACT

A vehicle suspension position adjustment arrangement including a frame member having a plurality of apertures, and a trailing arm having a first end pivotally coupled to a slide member and a second end biased away from the frame member. A locking pin movable between an unlocked position where the locking pin is withdrawn from one of the apertures and the slide member is free to slide along the frame member, and a locked position where the locking pin engages one of the apertures preventing the slide member from sliding along the frame member, and a plurality of sensors spaced along the frame member, wherein a single sensor of the plurality of sensors is configured to sense both the locking condition of the locking pin and the location of the locking pin along the frame member.

21 Claims, 5 Drawing Sheets

(56) References Cited

U.S. PATENT DOCUMENTS

| | | | | |
|---|---|---|---|---|
| 5,460,237 | A * | 10/1995 | Schueman | B62D 53/068 180/209 |
| 5,617,072 | A * | 4/1997 | McNeal | B62D 53/0807 280/441 |
| 5,716,071 | A * | 2/1998 | Stanley | B62D 53/00 33/708 |
| 6,384,716 | B1 * | 5/2002 | Eckelberry | B62D 53/068 180/209 |
| 6,921,100 | B2 * | 7/2005 | Mantini | B60G 17/005 280/407.1 |
| 8,534,688 | B1 * | 9/2013 | Dunn | B62D 53/068 280/149.2 |
| 9,039,022 | B2 * | 5/2015 | Horton | B62D 53/06 180/209 |
| 2003/0155164 | A1 * | 8/2003 | Mantini | B60G 17/005 180/209 |
| 2012/0248728 | A1 * | 10/2012 | Horton | B62D 53/068 280/149.2 |

* cited by examiner

VEHICLE SUSPENSION POSITION ADJUSTMENT ARRANGEMENT

CROSS REFERENCE TO RELATED APPLICATIONS

This application claims the benefit of U.S. Provisional Patent Application No. 62/858,121, filed on Jun. 6, 2019, entitled "VEHICLE SUSPENSION POSITION ADJUSTMENT ARRANGEMENT," the entire disclosure of which is incorporated herein by reference.

BACKGROUND

The embodiments as disclosed herein relate to a vehicle suspension positioning adjustment arrangement, and in particular to a vehicle suspension position adjustment arrangement for heavy-duty truck and trailer type vehicles, such as semi-trailers, that include suspension systems that are positionally adjustable along a length of the supported vehicle to thereby adjust weight distribution as supported by the suspension assembly.

SUMMARY

One embodiment of the disclosure includes a vehicle suspension position adjustment arrangement that includes a vehicle frame member, a slide assembly having a slide member movable along a longitudinal extent of the frame member, the slide member having a plurality of apertures spaced along the length thereof, a trailing arm having a first end pivotally coupled to the slide member and an opposing second end biased away from the frame member, the swing arm configured to support a wheel assembly with a tire for contacting the ground surface. The vehicle suspension position adjustment arrangement further includes a lock assembly including at least one locking pin movable between an unlocked position where the at least one locking pin is withdrawn from the plurality of apertures and the slide member is free to slide along the longitudinal extent of the frame member, and a locked position where the at least one locking pin engages one of apertures of the plurality of apertures thereby preventing the slide member from sliding along the longitudinal extent of the frame member, and a sensor arrangement including a plurality of sensors spaced along the longitudinal extent of the frame member, wherein a single sensor of the plurality of sensors is configured to sense whether the at least one locking pin is engaged with the one aperture of the plurality of apertures and to sense the relative location of the at least one locking pin along the longitudinal extent of the frame member.

Another embodiment of the disclosure includes a vehicle suspension position adjustment arrangement that includes a vehicle frame member, a support assembly including a support member movable along a length of the frame member, and a suspension assembly including a trailing arm having a first end pivotally coupled to the support member and an opposing second end biased away from the frame member, the trailing arm configured to support a wheel assembly with a tire for contacting the ground surface. The adjustment arrangement further includes a lock assembly movable between a locked position where the lock assembly engages the support member thereby preventing the suspension assembly from moving along the length of the frame member, and an unlocked configuration where lock assembly is disengaged from the support member and the suspension assembly is free to move along the length of the frame member, and a sensor arrangement including a plurality of sensors spaced along the length of the frame member, wherein a single sensor of the plurality of sensors is configured to sense whether the locking assembly is in the locked or unlocked position and the relative location of the suspension assembly along the length of the frame member.

Yet another embodiment of the disclosure includes a vehicle component position adjustment arrangement that includes a first vehicle component, a second vehicle component movable with respect to the first vehicle component, at least one of the first vehicle component and the second vehicle component including a plurality of apertures, and a lock assembly including first and second locking pins each movable between a locked position where the second vehicle component is fixed with respect to the second vehicle component, and an unlocked position where the second vehicle component is movable relative to the first vehicle component, and a first magnet fixed for movement with the first pin and a second magnet fixed for movement with the second pin, wherein a direction of magnetic polarity of the first magnet is offset from a direction of magnetic polarity of the second magnet with respect to vertical. The adjustment arrangement further includes a sensor arrangement including a Hall effect sensor configured to sense whether one of the locking pins is engaged within one aperture of the plurality of apertures and whether the locking pin engaged within the one aperture is the first locking pin or the second locking pin based on the direction of magnetic polarity of the locking pin engage with the one aperture.

These and other features, advantages, and objects of the embodiments of the disclosure will be further understood and appreciated by those skilled in the art by reference to the following specification, claims, and appended drawings.

DETAILED DESCRIPTION OF THE PREFERRED EMBODIMENTS

Figure 1:
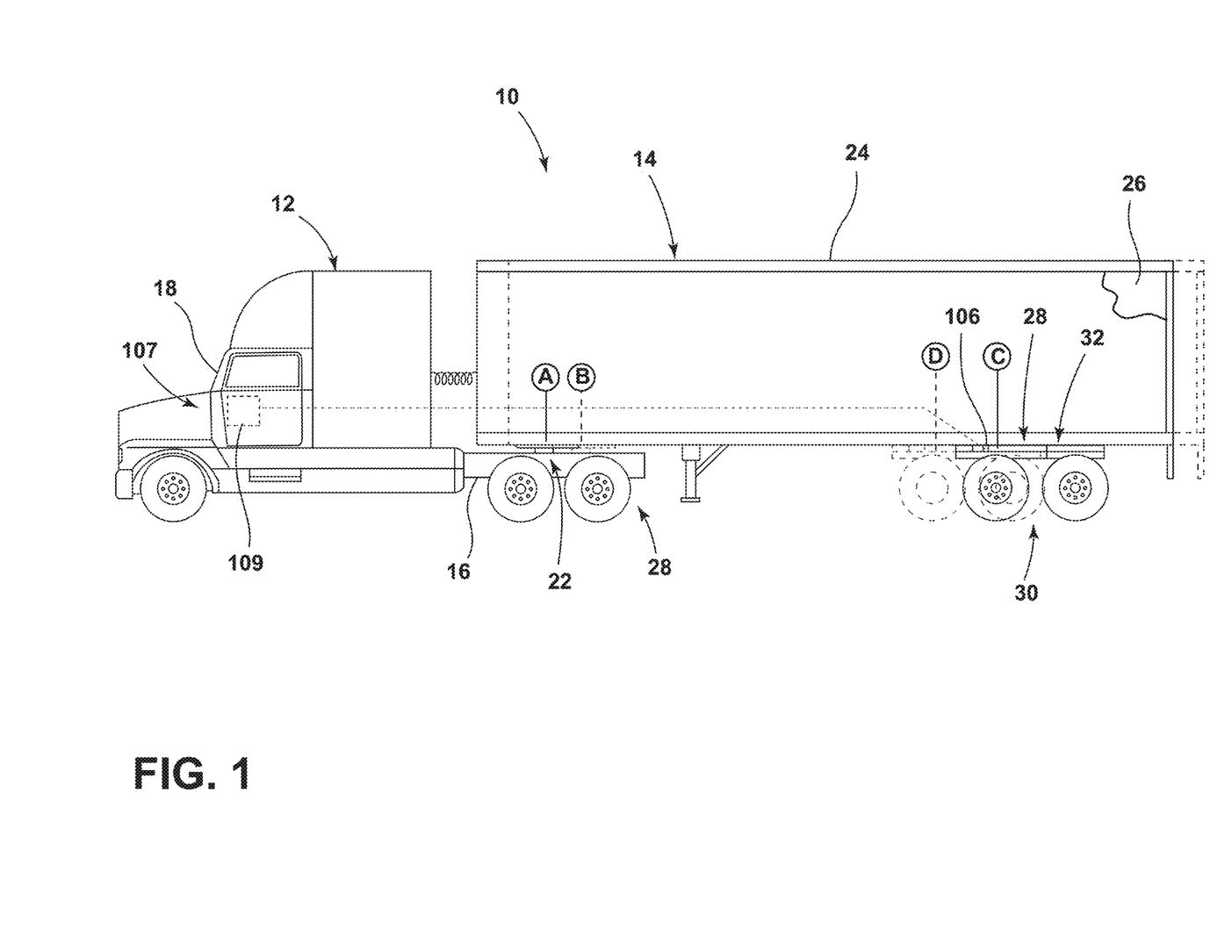
FIG. 1 is a side elevational view of a heavy duty, commercial vehicle arrangement, including a semi-tractor and a semi-trailer.
Figure 2:
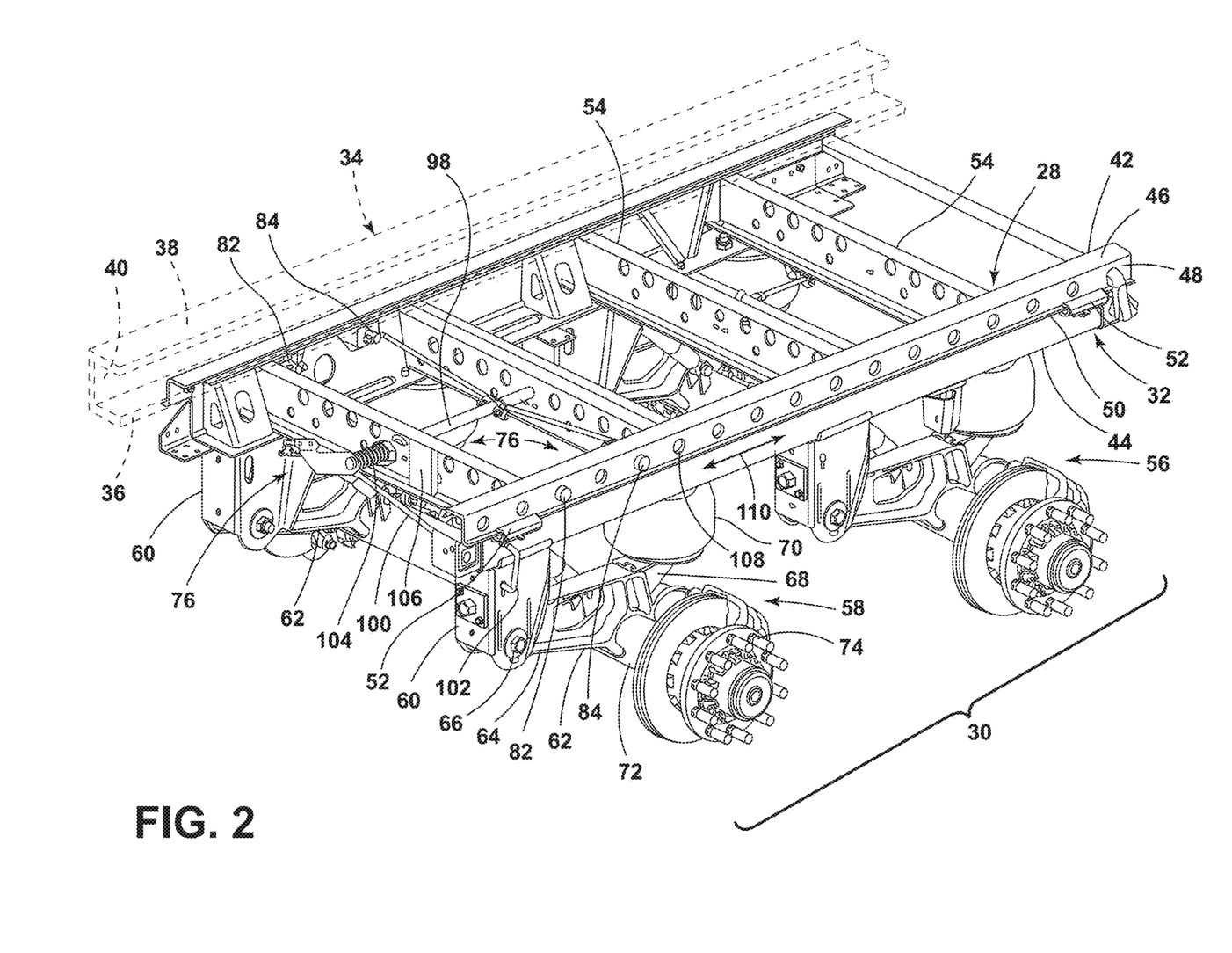
FIG. 2 is a perspective view of a vehicle suspension assembly and a slider assembly.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims.

Hence, specific dimensions and other characteristics relating to the embodiments disclosed herein are not to be considered as limiting, unless the claims expressly state otherwise.

Reference numeral 10 (FIG. 1) generally designates a truck and trailer combination that includes a towing vehicle 12 and a towed vehicle 14. In the illustrated example, the towing vehicle 12 includes a heavy-duty truck or semi-truck, while the towed vehicle includes a heavy-duty trailer or semi-trailer 14. The truck 12 includes a truck frame assembly 16, a cab 18 supported on the frame assembly 16, a rear suspension assembly 20, and a fifth wheel hitch plate assembly 22 configured to couple the trailer 14 to the truck 12. In the illustrated example, the fifth wheel hitch plate assembly 22 is movably coupled to the truck frame assembly 28 such that the relative position of the fifth wheel hitch plate assembly 22 may be adjusted along the length of the truck frame assembly 16 between a forward position A and a rearward position B as described below. The trailer 14 includes a trailer body 24 defining a interior cargo area 26 therein, a trailer frame assembly 28 supporting the trailer body 24, and a trailer suspension assembly 30 supporting the frame assembly 28. In the illustrated example, a slide assembly 32 movably couples the suspension assembly 30 to the trailer frame assembly 28, thereby allowing the relative position of the suspension assembly 30 to be adjusted along a length of the frame assembly 28 between a rearward position C and a forward position D.

The frame assembly 28 (FIG. 2) includes a pair of elongated frame members 42 each having a Z-shaped cross-sectional configuration including a horizontal upper portion 46 fixedly secured to an underside of the lower horizontal portion 36 of a respective frame rail 34, a vertical portion 48 extending downwardly from the horizontal upper portion 46, and an outwardly turned horizontal flanged portion 50. The slide assembly 32 includes a pair of slide support members 44 extending along and slidably coupled to the frame member 42. Each member 44 has a C-shaped cross-sectional configuration and includes a pair of outwardly extending, C-shaped slide brackets 52 that slidably engage the flanged portion 50 of a respective support member. A plurality of structural cross members 54 extend between the slide support members 44. Alternatively, the trailer frame assembly 28 may also include a pair of C-shaped trailer frame rails 34 extending longitudinally along the trailer 14. In the alternative embodiment, each trailer frame rail 34 includes a lower horizontal portion 36, an upper horizontal portion 38 and a vertical portion 40 extending therebetween.

In the illustrated example, the suspension assembly 30 includes a tandem axle arrangement including a forward axle arrangement 56 and a rear axle arrangement 58, where only the forward axle arrangement 56 is described herein, as each axle arrangement 56, 58 are similarly constructed. The forward axle arrangement 56 includes a pair of mounting brackets 60 each extending downwardly from and fixed to respective slide support members 44, a pair of trailing arms 62 each having a first end 64 pivotably coupled to a respective mounting bracket 60 for pivoting about a pivot point 66, and a second end 68 supporting an air spring 70 such that the air spring 70 is positioned between the second end 68 of the trailing arm 62 and a respective slide support member 44, thereby biasing the second end 68 of the trailing arm 62 away from the slide support member 44 and the frame member 42. The forward axle arrangement 56 also includes an axle member 72 fixedly coupled to the trailing arms 62 between the first end 64 and second end 68 thereof, where the axle member 72 is configured to support a wheel hub assembly at each end thereof where the wheel hub assembly 74 supports a tire (not shown) for contacting a ground surface.

Figure 3A:
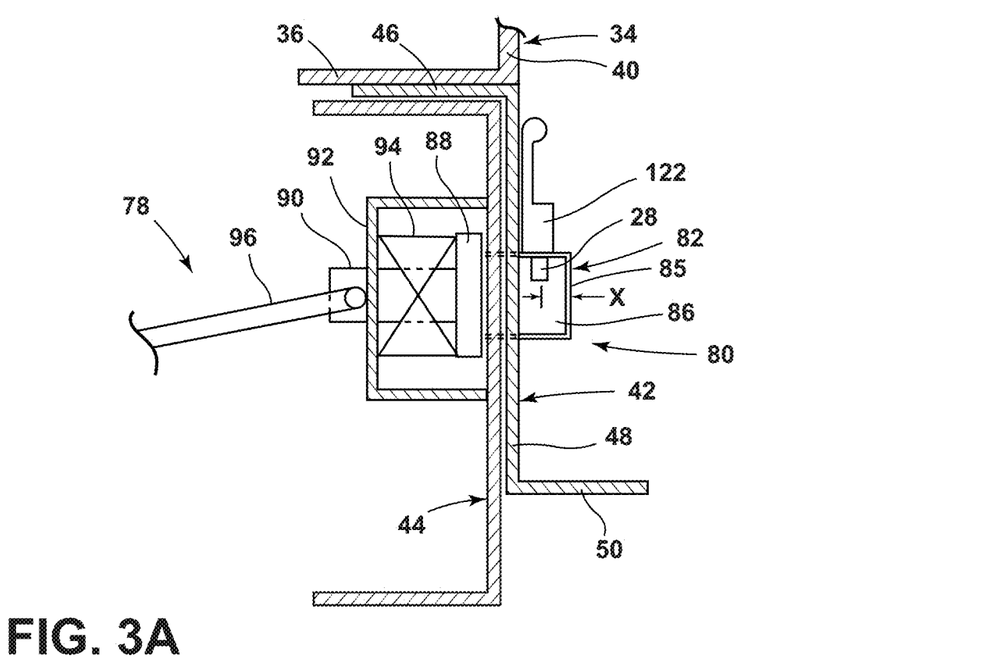
FIG. 3A is an end elevational view of the slider assembly, with a lock assembly in a locked position.
Figure 3B:
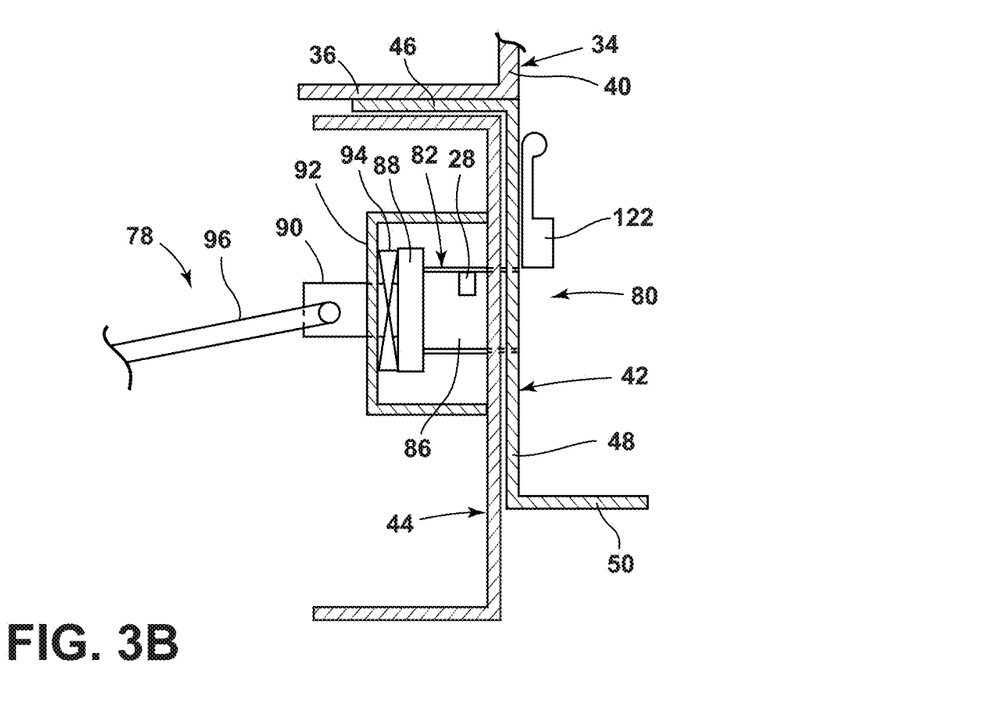
FIG. 3B is an end elevational view of the slider assembly, with the lock assembly in an unlocked position.

A lock assembly 76 is configured to lock the position of the suspension assembly 30 along the length of the frame member 42 (and the frame rails 34) at various incremental positions. In the illustrated example, the locking assembly 76 includes an actuator assembly 78 and a locking assembly 80 (FIGS. 3A and 3B) where the actuator assembly 78 moves the locking assembly 80 between the locked and unlocked positions. In the illustrated example, the locking assembly 80 includes a pair of locking pins located on each side of the slide assembly 32 including a forward locking pin 82 and a rear locking pin 84 as the forward locking pins 82 and the rear locking pins 84 are similarly constructed, only a forward locking pin 82 positioned on one side of the slide assembly 32 is described herein. The forward locking pin 82 includes an engagement portion 86, and abutment portion 88 positioned at an end of the engagement portion 86, and an actuator portion 90 extending from the abutment portion 88 opposite the engagement portion 86. The locking pin 82 is housed within a housing 92 and is movable between an engaged or locked position as illustrated in FIG. 3A, and a disengaged or unlocked position as illustrated in FIG. 3B, and as further described below. A coil spring 94 biases the locking pin 82 from the unlocked position toward the locked position.

The actuator assembly 78 includes an actuator rod 96 pivotably coupled to the actuator portion 90 of the locking pin 82, an actuator shaft 98 pivotably coupled to opposite ends of each actuator rod 96, and an actuator member 100 operably coupled at a first end to the actuator shaft 98 and to a manual handle 102 at an opposite end. A coil spring 104 biases the actuator rod 96 in a direction so as to move the locking pin 82 from the unlocked position toward the locked position. The actuator assembly 78 may be manually operated by an operator by grasping and pulling the handle 102 in a manner as is well known in the art. Alternatively, the actuator assembly 78 may include an actuator such as an electric drive motor 106 operably coupled to the actuator rod 76 thereby allowing the actuator assembly 78 and the locking assembly 80 to be driven via an input from the electric drive motor 106 in replacement of a manual input or actuation by an operator. Other alternative drive arrangements may also be utilized, including hydraulic drives, pneumatic drives, and the like. A control arrangement 107 may also be provided that includes the actuator assembly 78 and a control input 109 positioned remotely from the locking assembly 80 and may include a cpu and/or a control input device positioned within the cab 18 of the towing vehicle 12 so as to allow the operator to monitor and control the movement of the locking pins 82, 84 between the locked and unlocked configurations, as well as monitor the relative positions of the locking pins 82, 84 along the length of the frame member 42, thereby allowing the operator to adjust the relative position of the slide support member 44 and the suspension assembly 30 with respect to the frame member 42 and the overall trailer 14 without needing to leave the cab 18.

Figure 4:
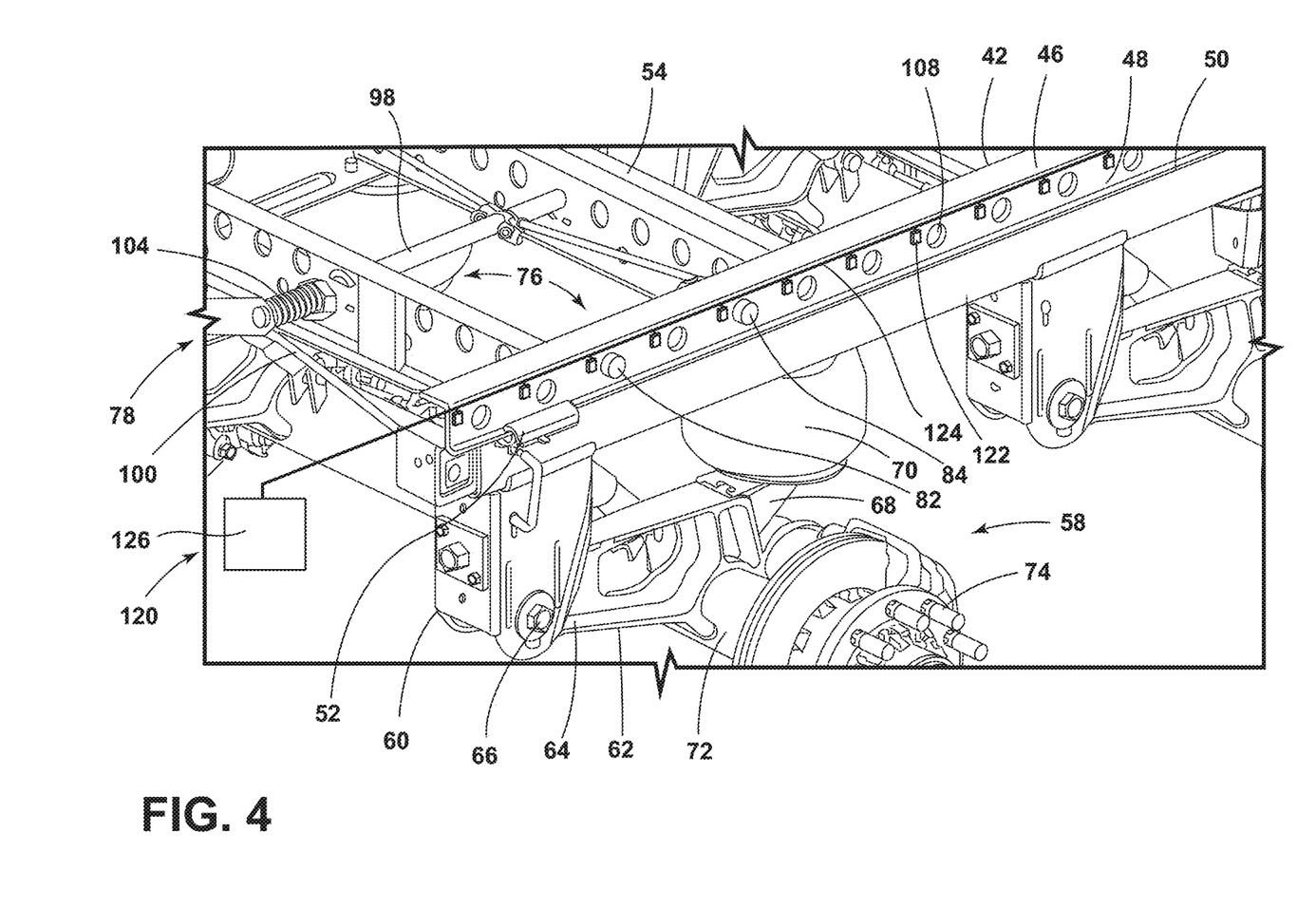
FIG. 4 is a perspective view of the slider assembly including a sensor arrangement.
Figure 5:
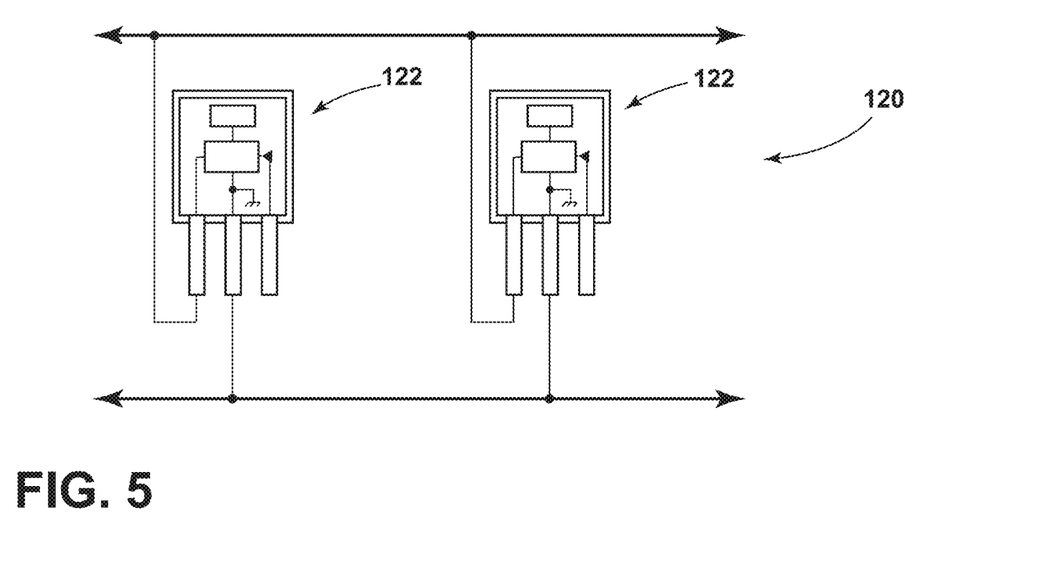
FIG. 5 is a schematic view of sensors of the sensor arrangement.
Figure 6A:
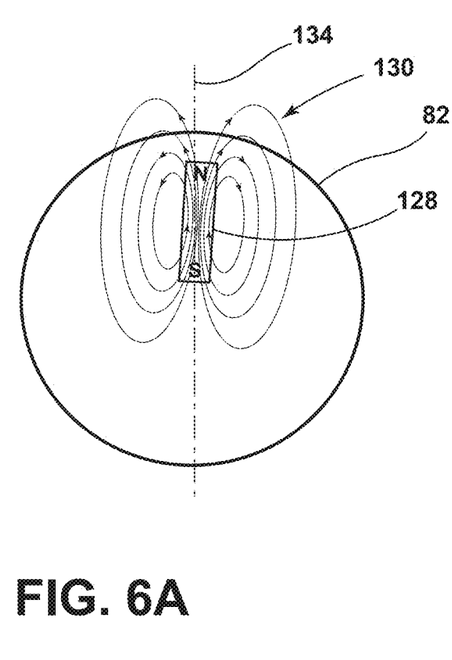
FIG. 6A is a schematic view of a magnetic field of a first locking pin.
Figure 6B:
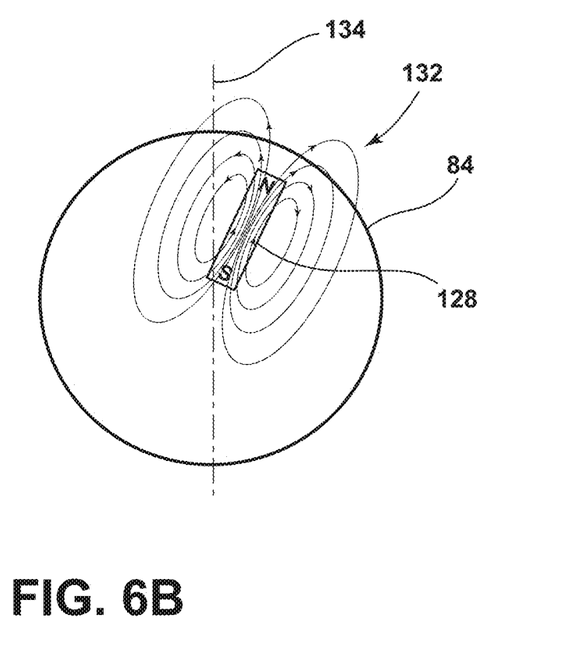
FIG. 6B is a schematic view of a magnetic field of a second locking pin.

As is best illustrated in FIG. 2, the vertical portion 48 of each support member 42 includes a plurality of apertures 108 spaced along the length thereof, where the apertures 108 are configured to selectively receive the locking pins 82, 84 therein. In operation, the locking pins 82, 84 engage two of the apertures 108 along the length of the support members 42, thereby preventing the locking pins 82, 84, the slide support member 44, and the suspension assembly 30 from being moved along the length of the support member 42 and the frame rails 34 in the directions 110. In order to adjust the relative position of the suspension assembly 30 with respect to the trailer frame assembly 28, the operator via the manual handle 102 or by activating the drive motor 106 moves the actuator assembly 78 to move the locking pins 82, 84 of the locking assembly 80 from the locked position as shown in FIG. 3A to the unlocked position FIG. 3B, thereby withdrawing the locking pins 82, 84 from the two apertures of the apertures 108 thereby allowing the slide support member 44 to slide with respect to the support member 42 in the directions 110. As the brakes of the trailer 14 are engaged, the operator may then adjust the relative position of the suspension assembly 30 with respect to the trailer frame assembly 28 by moving the truck 12 in a forward or rearward direction, thereby sliding the support member 42 relative to the slide support member 44 in the directions 110. Once the suspension assembly 30 is properly aligned in a new position with the trailer frame assembly 28, the locking pins 82, 84 are reengaged with two new apertures of the apertures 108. A sensor arrangement 120 (FIG. 4) includes a plurality of individual sensors 122 (FIGS. 3A-FIG. 4) spaced along the length of the support member 42 such that one sensor is attached to the support member 42 proximate each of the apertures 108. In the illustrated example, each sensor 102 includes a Hall effect type sensor. Preferably, each Hall effect type sensor 122 includes a low voltage Hall effect linear sensor configured to sense a magnetic field strength which depends on a polarity and magnitude of the magnetic field being measured. Each of the sensors 122 is connected to a sensor bus 124 which is in turn connected to a logic unit or CPU 126, where each individual sensor 122 is configured to provide a unique digital identifier from the remaining sensors. As best illustrated in FIGS. 3A and 3B, each locking pin 82 includes a magnet 28 embedded therein at a distance X from an end face 85 of the locking pin 82. As best illustrated in FIGS. 6A and 6B the magnet 128 within the forward locking pin 82 and the rear locking pin 84 are offset from one another such that the direction of the magnetic polarity 132 of the magnet 128 within the forward locking pin 82 is offset from the direction of magnetic polarity 132 of the magnet 128 embedded within the rear pin 84 with respect to vertical represented by line 134. In operation, each sensor 122 senses the magnetic field strength of each of the magnets 128 embedded within the locking pins 82, 84, where the strength of the magnetic field as sensed by the sensors 122 is affected by the direction of the magnetic polarity and magnitude of the magnetic field generated by each of the magnets 128. The strength of the magnetic field as monitored by each individual sensor 122 is then communicated with the logic unit 126, and the unique identifier associated with each of the sensors 122 allows the logic unit 126 to identify which aperture of the apertures 108 each locking pin 82, 84 is engaged within and calculate the position of the suspension assembly 130 along the length of the frame rails 34 and the trailer frame assembly 28.

In the foregoing description, it will be readily appreciated by those skilled in the art that modifications may be made to the various embodiments as disclosed herein without departing from the concepts as embodied and disclosed herein. Such modifications are to be considered as included in the following claims, unless these claims by their language expressly state otherwise.

The invention claimed is:

1. A vehicle suspension position adjustment arrangement, comprising:
    a frame member;
    a slide assembly including a slide member slidably coupled to the frame member and movable along a longitudinal extent of the frame member, the frame member having a plurality of apertures spaced along the length thereof;
    a trailing arm having a first end pivotally coupled to the slide member and an opposing second end biased away from the frame member, the trailing arm configured to support a wheel assembly with a tire for contacting a ground surface;
    a lock assembly including at least one locking pin movable between an unlocked position where the at least one locking pin is withdrawn from the plurality of apertures and the slide member is free to slide along the longitudinal extent of the frame member, and a locked position where the at least one locking pin engages one of apertures of the plurality of apertures thereby preventing the slide member from sliding along the longitudinal extent of the frame member; and
    a sensor arrangement including a plurality of sensors spaced along the slide support member, wherein a single sensor of the plurality of sensors is configured to sense whether the at least one locking pin is engaged with the one aperture of the plurality of apertures and to sense the relative location of the at least one locking pin along the longitudinal extent of the frame member.

2. The vehicle suspension position adjustment arrangement of claim 1, wherein each sensor of the plurality of sensors includes a Hall effect sensor.

3. The vehicle suspension position adjustment arrangement of claim 1, wherein the at least one locking pin includes a magnet coupled for movement therewith.

4. The vehicle suspension position adjustment arrangement of claim 3, wherein the magnet is embedded within the at least one locking pin.

5. The vehicle suspension position adjustment arrangement of claim 1, wherein the at least one locking pin includes a first locking pin and a second locking pin.

6. The vehicle suspension position adjustment arrangement of claim 5, wherein the first locking pin includes a first magnet coupled for movement therewith and the second locking pin includes a second magnet coupled for movement therewith, and wherein a direction of magnetic polarity of the first magnet is offset from a direction of magnetic polarity of the second magnet with respect to vertical.

7. The vehicle suspension position adjustment arrangement of claim 1, wherein the sensor arrangement is configured to sense a depth of engagement of the at least one locking pin within the one of the apertures of the plurality of apertures.

8. A vehicle suspension position adjustment arrangement, comprising:
    a frame member;
    a support assembly including a support member movably coupled to the frame member such that the support member is movable along a length of the frame member;
    a suspension assembly including a trailing arm having a first end pivotally coupled to the support member and an opposing second end biased away from the frame member, the trailing arm configured to support a wheel assembly with a tire for contacting a ground surface;
    a lock assembly movable between a locked position where the lock assembly engages the frame member thereby preventing the suspension assembly from moving along the length of the frame member, and an unlocked configuration where the lock assembly is disengaged from the frame member and the suspension assembly is free to move along the length of the frame member; and a sensor arrangement including a plurality of sensors spaced along the frame member, wherein a single sensor of the plurality of sensors is configured to sense whether the locking assembly is in the locked or unlocked position and the relative location of the suspension assembly along the length of the frame member.

9. The vehicle suspension position adjustment arrangement of claim 8, wherein the support member is configured to slide along the frame member.

10. The vehicle suspension position adjustment arrangement of claim 8, wherein the support member includes a plurality of apertures spaced along the length thereof, and wherein the lock assembly engages at least one of the plurality of apertures when in the locked position.

11. The vehicle suspension position adjustment arrangement of claim 10, wherein the lock assembly includes a locking pin movable between the locked position where the locking pin engages one of the apertures of the plurality of apertures thereby preventing the suspension assembly from moving along the length of the frame member, and the unlocked position where the locking pin is withdrawn from the one aperture of the plurality of apertures and the suspension assembly is free to move along the length of the frame member.

12. The vehicle suspension position adjustment arrangement of claim 11, wherein the single sensor of the plurality of sensors is configured to sense whether the locking pin is engaged within the aperture and to sense the relative location of the locking pin along the length of the frame member.

13. The vehicle suspension position adjustment arrangement of claim 8, wherein each sensor of the plurality of sensors includes a Hall effect sensor.

14. The vehicle suspension position adjustment arrangement claim 8, further comprising:
a control arrangement configured to allow remote actuation of the lock assembly between the unlocked and locked positions by an operator.

15. A trailer assembly, comprising:
the vehicle suspension position adjustment arrangement of claim 8; and
a hitch assembly attached to the frame member configured to couple to a towing vehicle.

16. A vehicle component position adjustment arrangement, comprising:
a first vehicle component;
a second vehicle component movable with respect to the first vehicle component, at least one of the first vehicle component and the second vehicle component including a plurality of apertures;
a lock assembly including first and second locking pins each movable between a locked position where the second vehicle component is fixed with respect to the second vehicle component, and an unlocked position where the second vehicle component is movable relative to the first vehicle component, and a first magnet fixed for movement with the first pin and a second magnet fixed for movement with the second pin, wherein a direction of magnetic polarity of the first magnet is offset from a direction of magnetic polarity of the second magnet with respect to vertical; and
a sensor arrangement including a Hall effect sensor configured to sense whether one of the locking pins is engaged within one aperture of the plurality of apertures and whether the locking pin engaged within the one aperture is the first locking pin or the second locking pin based on the direction of magnetic polarity of the locking pin engage with the one aperture.

17. The vehicle component position adjustment arrangement of claim 16, wherein the first vehicle component includes a frame member and the second vehicle component includes a slide member slidably coupled to the frame member such that the slide support member is movable along a length of the frame member, the support member including the plurality of apertures spaced along a length thereof; and further comprising:
a trailing arm having a first end pivotally coupled to the slide member and an opposing second end biased away from the frame member, the trailing arm configured to support a wheel assembly with a tire for contacting a ground surface.

18. The vehicle suspension position adjustment arrangement of claim 17, wherein the first end of the trailing arm is pivotally coupled to the slide member via a mounting bracket that extends downward from the slide member.

19. The vehicle component position adjustment arrangement of claim 16, wherein the Hall effect sensor is one of a plurality of Hall effect sensors, and wherein one of the plurality of Hall effect sensors is located proximate each of the apertures of the second vehicle component.

20. The vehicle suspension position adjustment arrangement of claim 16, wherein the sensor arrangement is configured to sense a depth of the one of the locking pin within the one aperture.

21. A trailer assembly, comprising:
the vehicle suspension position adjustment arrangement of any one of claim 16; and
a hitch assembly attached to the frame member and configured to couple to a towing vehicle.

* * * * *

UNITED STATES PATENT AND TRADEMARK OFFICE
CERTIFICATE OF CORRECTION

| | |
|---|---|
| PATENT NO. | : 11,518,452 B2 |
| APPLICATION NO. | : 16/893642 |
| DATED | : December 6, 2022 |
| INVENTOR(S) | : Schutt et al. |

It is certified that error appears in the above-identified patent and that said Letters Patent is hereby corrected as shown below:

In the Specification

Column 1, Line 65:
After "where" insert -- the --

Column 2, Line 15:
"second" should be – first –

Column 2, Line 29:
"engage" should be – engaged –

Column 3, Line 19:
"a" (2nd occurrence) should be – an –

Column 3, Line 52:
"are" should be – is –

Column 4, Line 18:
"and" should be – an –

Column 4, Line 49:
"cpu" should be – CPU –

Column 5, Line 8:
After "position" insert -- in --

Column 5, Line 37:
After "6B" insert -- , --

Signed and Sealed this
Tenth Day of September, 2024

*Katherine Kelly Vidal*
Katherine Kelly Vidal
*Director of the United States Patent and Trademark Office*

CERTIFICATE OF CORRECTION (continued)
U.S. Pat. No. 11,518,452 B2

In the Claims

Column 8, Claim 16, Line 20:
"engage" should be – engaged –

Column 8, Claim 21, Line 49:
Delete "any one of"